(12) United States Patent
Tanaka et al.

(10) Patent No.: US 6,533,883 B1
(45) Date of Patent: Mar. 18, 2003

(54) METHOD OF MANUFACTURING OPTICAL MEDIUM

(75) Inventors: Akiyoshi Tanaka, Tama (JP); Katsuhisa Itoh, Ome (JP)

(73) Assignee: Hoya Corporation, Tokyo (JP)

( * ) Notice: Subject to any disclaimer, the term of this patent is extended or adjusted under 35 U.S.C. 154(b) by 182 days.

(21) Appl. No.: 09/626,081

(22) Filed: Jul. 26, 2000

(30) Foreign Application Priority Data

Jul. 26, 1999 (JP) .......................................... 11/210285

(51) Int. Cl.[7] .............................. H01S 3/10; G02B 6/00
(52) U.S. Cl. ...................... 156/169; 156/180; 264/1.24; 264/1.28; 264/1.29; 372/6
(58) Field of Search ................................ 156/169, 172, 156/180, 184; 264/1.24, 1.28, 1.29; 372/6; 242/173

(56) References Cited

U.S. PATENT DOCUMENTS

| | | | | |
|---|---|---|---|---|
| 4,815,079 A | * | 3/1989 | Snitzer et al. ................. | 372/6 |
| 4,952,022 A | * | 8/1990 | Genovese .................... | 156/169 |
| 5,205,890 A | * | 4/1993 | Darsey et al. .............. | 156/169 |
| 5,230,844 A | * | 7/1993 | Nishiguchi et al. ......... | 264/1.24 |
| 5,534,558 A | * | 7/1996 | Minns ..................... | 427/163.2 |
| 5,966,490 A | * | 10/1999 | Minns et al. ................ | 385/123 |
| 6,052,392 A | * | 4/2000 | Ueda et al. .................... | 372/6 |
| 6,178,187 B1 | * | 1/2001 | Ueda ............................ | 372/6 |

FOREIGN PATENT DOCUMENTS

| | | |
|---|---|---|
| JP | 10-135548 | 5/1998 |
| JP | 10-190097 | 7/1998 |

OTHER PUBLICATIONS

H. Zellmer, W. Williamowski, A. Tunnermann, and H. Welling, "High–Power CW Neodymium–Doped Fiber Laser Operating at 9.2 W. With High Beam Quality", Optics Letters, vol. 20, No. 6, pp. 578–580, Mar. 1995.

* cited by examiner

Primary Examiner—Michael W. Ball
Assistant Examiner—John T. Haran
(74) Attorney, Agent, or Firm—Sughrue Mion, PLLC

(57) ABSTRACT

In a method of manufacturing an optical medium, an extended optical conductor containing active substance is formed to a predetermined shape by the use of resin by repeatedly folding or winding the optical conductor. A laser light beam or an amplified light beam is outputted from an edge portion of the optical conductor by absorbing an excitation light beam incident from the side surface of the optical conductor into the active substance through the resin. Thermoplastic resin is used as the resin. The thermoplastic resin transmits the excitation light beam. The resin is heated up to a glass transition temperature or higher. The optical conductor and the resin are bonded to each other so as to constitute a predetermined shape. The resin is cured.

12 Claims, 4 Drawing Sheets

OUTPUT LASER LIGHT BEAM

METHOD OF MANUFACTURING OPTICAL MEDIUM

BACKGROUND OF THE INVENTION

This invention relates to a method of manufacturing an optical medium, and in particular, to a manufacturing method suitable for an optical fiber oscillator or an optical waveguide laser oscillator.

In a field of an optical communication or a laser process, it has been desirably required to develop a cheaper laser device having a higher output.

Conventionally, an optical fiber laser device has been known as a device satisfying this requirement.

In such an optical fiber device, a core diameter and index of refraction between a core and a clad are suitably selected. Thereby, a laser light beam of high quality can be relatively simply obtained.

Further, an interactive operation between laser active substance and the light beam can be enhanced by sealing the light beam with high density.

Moreover, an interactive operation length can be enlarged by lengthening the optical fiber. Thereby, the laser beam having the high quality can be spacially generated with high efficiency. Consequently, the laser light beam of high quality can be relatively cheaply obtained.

In this case, it is necessary to efficiently introduce an excitation light beam into a doping region (generally, referred to as a core portion) of a luminescent center (hereinafter, referred to as laser active substance), such as, a laser active ion, a color element of the optical fiber in order to realize further high-output and high-efficiency of the laser light beam.

Meanwhile, when the core diameter is generally set so as to satisfy a waveguide condition of a single mode, the diameter is restricted to several tens $\mu$m or less. In consequence, it is generally difficult to efficiently introduce the excitation light beam for the small core diameter.

To solve such a problem, suggestion has been made about a double clads type fiber laser, for example, as disclosed in H. Zellmer, U. Willamowski, A. Tunnermann, and H. Welling, Optics Letters. Vol. 20, No.6, pp. 578–580, March, 1995.

In such a double clads type fiber laser, a first clad portion having lower index of refraction than the core portion is arranged around the core portion, and a second clad portion having further lower index of refraction is provided at an outside portion thereof.

Thereby, the excitation light beam introduced into the first clad portion propagates by total reflection due to a difference of index of refraction between the first clad portion and the second clad portion on the condition that the excitation light beam is sealed in the first clad portion.

During the propagation, the excitation light beam repeatedly passes the core portion to excite the laser active substance of the core portion.

In this event, the first clad portion has a large area of about hundred times in comparison with the core portion. Consequently, it is possible to further introduce many excitation light beams and to produce a high output.

In the double clads type fiber laser advantageously has high oscillation efficiency and a single and stable oscillation lateral mode.

Further, an output within the range between several watt to about 10 watt can be obtained by the use of a laser diode (hereinafter, abbreviated as a LD). In consequence, a further higher output can be realized as compared to the conventional core type fiber laser.

However, edge excitation is carried out from an edge or both edges of the fiber in such a double clads type fiber laser. Consequently, the number of the LDs for excitation can not be increased.

Namely, it is indispensable to achieve a high output of an introduced LD to produce a laser light beam having an high output in the double clads type fiber laser.

To solve this problem, suggestion has been made about a method for bundling a plurality of double clads type fiber lasers to achieve the high output. Although an average output can be increased with the bundled number, brightness is inevitably lowered. This reason will be explained below.

Namely, the core portions as luminescent points are widely dotted in a space because a larger clad portion (having a diameter of about 100 times) than the core is attached to the core portion. Thus, light-gathering performance can not be enhanced only by bundling a plurality of fiber lasers.

Therefore, another suggestion has been made about a laser device in which a fiber is repeatedly folded or wound in a disk-like region or a cylindrical region, and a plurality of LD light sources (beams) are inputted as excitation light beams from the periphery of the fiber laser having the disk-like structure or the cylindrical structure, as disclosed in Japanese Unexamined Patent Publication No. Hei. 10-135548, or Hei. 10-190097.

However, when these laser devices are manufactured, the fiber is dipped in resin and cured or hardened to keep these shapes after the fiber is formed to the disk-shape or the cylindrical shape.

In consequence, it is difficult to manufacture the fiber and to form to an arbitrary shape.

SUMMARY OF THE INVENTION

It is therefore an object of this invention to provide a method of manufacturing an optical medium which is readily capable of manufacturing it.

It is another object of this invention to provide a method of manufacturing an optical medium which is capable of improving a laser output by using a fiber laser which is superior in light-gathering performance and has a thermally stable output and a lateral mode.

According to a first aspect of this invention, an optical medium is manufactured by the following steps.

An extended optical conductor containing active substance is first formed to a predetermined shape by the use of resin by repeatedly folding or winding the optical conductor.

A laser light beam or an amplified light beam is outputted from an edge portion of the optical conductor by absorbing an excitation light beam incident from a side surface of the optical conductor into the active substance through the resin.

Thermoplastic resin is used as the resin. In this event, the thermoplastic resin transmits the excitation light beam.

The resin is heated up to a glass transition temperature or higher.

The optical conductor and the resin are bonded to each other so as to constitute a predetermined shape. Finally, the resin is cured.

In the first aspect, the fiber is repeatedly folded or wound in a region of a disk shape or a cylindrical shape. The excitation light beams can be incident through a plurality of LD light sources from the periphery of the fiber laser having the disk shape or the cylindrical shape. Thereby, the laser output can be increased.

The fibers must be bonded or welded and be integrated the desired shape in order to mold the fiber for the fiber laser to the disk shape or the cylindrical shape.

As the molding method, it may be readily assumed that the fiber containing glass as a main component is thermally welded.

However, when the fiber is formed by only the glass material in this method, thermal deformation temperature becomes high (several hundreds ° C. or higher). Consequently, the molding process is not easy.

Further, the fiber is often damaged in the molding process by an affect of scratches which may be made in the molding process. Therefore, the resin is generally coated so as to enhance the strength of the fiber.

The first aspect is characterized in that the thermoplastic optical resin is used as the resin material for coating the fiber. In this case, the thermoplastic optical resin can be readily and thermally molded.

Moreover, the thermoplastic optical resin can be coated onto the fiber surface by the in-line process in the step for making the fiber from the fiber preform as serving as the starting material. In consequence, the desired laser fiber can be readily produced.

In addition, thermal deformation generally occurs at a low temperature of about 200° C. or lower in the thermoplastic resin. Consequently, the fiber laser having the disk shape or the cylindrical shape can be readily and thermally molded.

In this case, phenol resin or melamine resin is the thermosetting resin having a bridge point. When the heating temperature is gradually increased in the thermosetting resin, slight fluidization can be obtained. However, immediately after this, the thermosetting starts and proceeds. Consequently, it is difficult to thermally mold such resin.

In the meantime, resin deformation occurs when the thermoplastic resin is put into a high temperature state. When the resin is re-cooled, the resin is formed on the condition that the deformed structure is kept or maintained. As a result, the resin can be readily and thermally molded.

As the representative thermoplastic resin, acrylic rein, polycarbonate resin, polyethylene resin, polystyrene resin, vinyl chloride resin, and epoxy resin are exemplified. In this event, the resin may be polymer having a line-like structure, and can achieve the above-mentioned object of this invention.

In the thermoplastic resin, the temperature for starting the thermal deformation, namely, the glass transition temperature is approximately 100° C. Consequently, the fiber coated by the thermoplastic resin is wound to the disk shape or the cylindrical shape, and is heated to 100° C. to weld the fibers to each other.

Further, the coated resin is lowered to the desired viscosity as the state for thermally welding it. Thereby, the fibers can be more readily welded. Thereafter, the resin is cooled to the glass transition temperature or lower. Consequently, the fiber laser apparatus can generate the laser light beam having the high output.

In the second aspect of this invention, the optical conductor is preferably an optical fiber. When the optical conductor is formed by the optical fiber in which the core and the clad are integrated, the optical medium can has superior light-gathering performance, and the output and the lateral mode are thermally stable in the optical medium.

In the third aspect of this invention, the optical fiber has an outermost layer while the resin has first index of refraction. The outermost layer has second index of refraction. With this structure, the first index is equal to or substantially equal to the second index.

When the resin has the index of refraction equal to or substantially equal to the index of the refraction of the outermost layer of the optical fiber, the light beam can be readily introduced into the outermost layer of the optical fiber through the resin.

In the fourth aspect of this invention, the optical conductor is a core of an optical fiber. The resin has first index of refraction while the core has second index of refraction. In this condition, the first index is lower than the second index.

The optical conductor is composed of the core material constituting a part of the optical fiber, and the index of refraction of the resin is made lower than the index of refraction of the core to serve the clad material.

Consequently, the optical medium can be more readily manufactured, and further, the light beam can be sealed with high density.

In the fifth aspect of this invention, the optical conductor and the resin are formed to the predetermined shape by the thermal welding process or the thermal molding process.

The resin, which is readily molded, interposed between the conductors. Thereby, the general molding method, such as, the thermal welding and the thermal molding, can be adopted as the method for forming the optical medium to the desired shape.

In the sixth aspect of this invention, the resin contains bubbles. The bubbles are removed by reducing a pressure or by increasing a pressure during the thermal molding process.

The bubbles can be easily removed by reducing the pressure or by increasing the pressure during the thermal molding process.

In the seventh aspect of this invention, the optical conductor and the resin are formed to the predetermined shape by heating the resin in inert gas atmosphere.

When the resin is heated in the inert gas atmosphere, the resin does not occur a chemical change, and impurities are not mixed into the resin.

In the eighth aspect of this invention, the optical conductor and the resin are formed to the predetermined shape by previously coating the optical conductor with the resin, repeatedly folding or winding the optical conductor, and heating the optical conductor.

If the optical conductor is coated with resin in advance, it is unnecessary to coat the resin in the subsequent process. Consequently, the molding process for obtaining the optical medium having the desired shape becomes easy.

In the ninth aspect of this invention, the optical conductor is drawn into fiber. The liquid resin is applied to the optical conductor. The liquid resin is ultraviolet polymerized and/or thermal polymerized. In this event, the steps are carried out by an in-line process.

If the coating formation of the resin is carried out by the in-line process, the molding process for obtaining the optical medium having the desired shape becomes further easy.

In the tenth aspect of this invention, at least one portion of a surface of the resin is polished after curing the resin. In this case, at least one portion corresponds to the surface for reflecting the excitation light beam.

With such a structure, the surface itself of the resin becomes the surface for reflecting the excitation light beam.

Alternatively, additional external resin for reflecting the excitation light beam may be coated with the surface of the resin.

More Specifically, at least one portion of the resin surface corresponds to an edge portion of the optical conductor for outputting or taking out the laser light beam, an edge portion of the optical conductor for reflecting the light beam, or an outer periphery surface of the optical conductor for introducing the excitation light beam.

Such a part is polished, and the surface for reflecting the excitation light beam or the external resin is removed. Thereby, the laser light beam is outputted or taken out in a simple manner. As a result, efficiency for reflecting the light beam at the edge portion and for introducing the excitation light beam can be enhanced.

In the eleventh aspect of this invention, the optical medium is manufactured by the use of the method according to the first aspect.

The excitation optical source is arranged such that the excitation light beam is incident from the side surface of the optical conductor and is absorbed into the active substance in order to excite the active substance. The laser beam is outputted from the edge of the optical conductor.

With this structure, much excitation light beams are incident from the side surface of the conductor of the optical medium. In consequence, the laser light beam having the high output can be obtained.

In the twelfth aspect of this invention, the optical medium is manufactured by the use of the method according to the first aspect.

The excitation optical source is arranged such that the excitation light beam is incident from the side surface of the optical conductor and is absorbed into the active substance in order to excite the active substance. The amplified light beam is outputted from the edge of the optical conductor.

With such a structure, much excitation light beams are incident from the side surface of the conductor of the optical medium. Consequently, much higher amplification degree can be obtained.

DESCRIPTION OF PREFERRED EMBODIMENT

Description will be made about an embodiment of this invention with drawings.

First, a quartz glass fiber preform rod is fabricated. In the preform, an outside layer of a core containing rare earth ions as a laser active substance is composed of a quartz glass clad layer.

Although description will be about the quartz glass fiber below, the material is not restricted to the quartz glass, and the fiber preform, which has no clad layer and is composed of only glass containing the laser active substance, may be used.

In this event, the fiber is made of the quartz glass fiber preform by the use of a glass fiber drawing apparatus.

Figure 3:
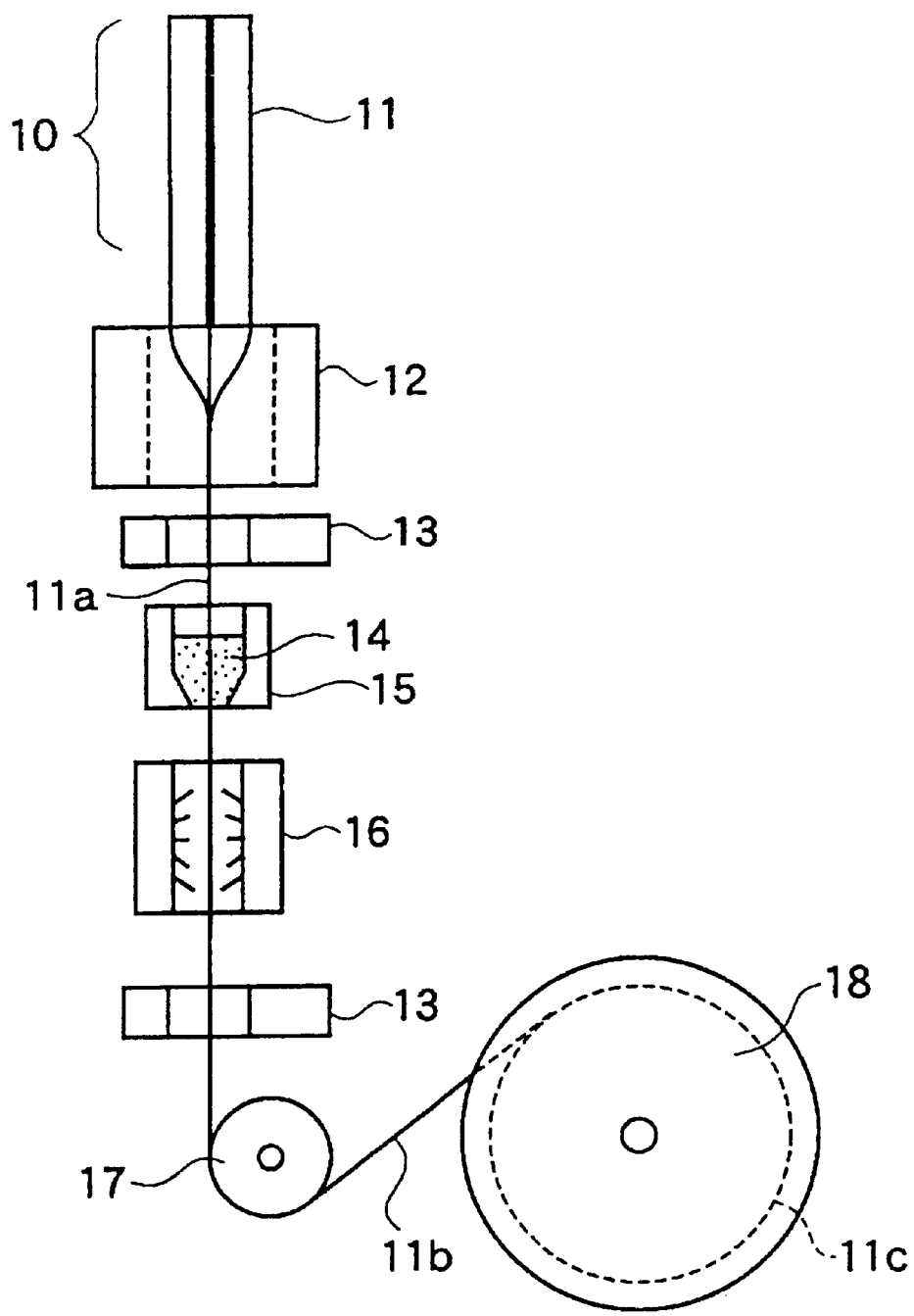
FIG. 3 is a process diagram for forming a fiber using a quarts glass fiber preform by a glass fiber drawing apparatus according to an embodiment of this invention.

This step will be explained with reference to FIG. 3.

The fiber drawing apparatus has a tower type structure, and generally includes a fiber preform mounting portion 10, a heat furnace 12, a resin monomer filling cup 15 for coating material, a resin coating portion 16, a fiber taking-over portion 17, and a fiber winding portion 18.

In this event, the fiber preform mounting portion 10 mounts a quartz fiber preform 11 from an upper portion of the tower. The heat furnace 12 heats the preform 11 and draws the preform 11 into fiber to reduce a diameter.

The resin monomer filling cup 15 fills a thermoplastic transparent resin liquid 14 and applies to the drawing fiber 11a. The resin coating portion 16 cures or hardens the coating applied to the fiber 11a and is composed of a resin coating light apparatus or a heat polymer apparatus.

The fiber taking-over portion 17 comprises a capstan which takes over the thermoplastic resin-coating fiber 11b. The fiber-winding portion 18 winds the resin-coating fiber 11b as a fiber 11c for the laser fiber.

Further, an outer diameter-measuring device 13 is provided between the heat furnace 12 and the resin monomer-filling cup 15, and between the resin coating portion 16 and the taking-over portion 17, respectively. This outer diameter-measuring device measures an outer diameter of the drawing fiber 11a or the resin-coating fiber 11b.

The quartz fiber preform 11 is mounted to the fiber preform mounting portion 10 of the fiber wire drawing apparatus, and is heated in the heat furnace 12. Thereby, the preform 11 is reduced in diameter to obtain the fiber 11a.

Subsequently, the thermoplastic resin monomer liquid serving as the thermoplastic transparent resin liquid 14 is injected into the resin monomer filling cup 15 thereunder.

In this case, the thermoplastic monomer includes methacrylic acid, styrene, urethane acrylate, bis-hydroxypropane, and epoxy propane. In certain cases, an optical polymerization initiator or a thermal polymerization initiator may be added to the thermoplastic monomer as additives for polymer activation.

The resin after polymerizing and curing (hardening) must be transparent such that a wavelength light beam of at least one portion among wavelengths of 0.6–1.0 $\mu$m transmits with loss of 50 dB/m or less.

Further, the index of refraction of the resin after curing preferably has a value (within the range of −3% between +3%) almost near the index of refraction of the clad glass of the laser fiber to be coated.

The fiber coated by the resin monomer transmits through the resin-coating portion 16 thereunder. Thereby, the thermoplastic resin-coating fiber 11b can be obtained.

Further, the diameter of the fiber is controlled by adjusting taking-over speed of the fiber taking-over portion 17 so as to obtain the desired fiber 11c for the laser fiber.

Figure 1A:
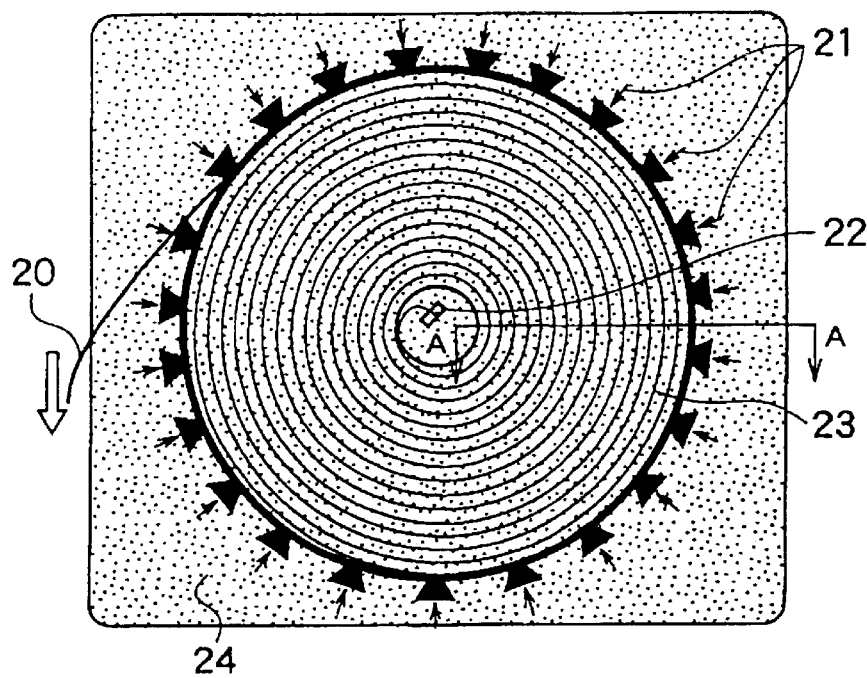
FIG. 1A is a plan view for explaining a fiber laser device having a disk-like structure according to an embodiment of this invention.

The fiber 11c for the laser fiber is wound to a whirling shape such that the thermoplastic resins 25 of the resin coating portion contacts to each other, as illustrated in FIG. 1A.

When the resin 25 are heated at thermally deformation temperature of the resin, for example, approximately 100° C. in the case of achryle based resin with the above-mentioned state being kept, the resins 25 are thermally welded to each other.

With regard to viscosity of the thermal molding, the resin 25 is more readily and thermally welded with suitably lower viscosity. Herein, the viscosity value preferably falls within the range between $10^4$ and $10^8$ poise, more preferably, within the range $10^5$ between $10^7$ poise.

The relationship between the viscosity and the temperature is different in dependency upon the kind of the resin. For example, poly methyl methacrylate has melting viscosity of about $5 \times 10^4$ poise at about 200° C. while polycarbonate has the melting viscosity of about $5 \times 10^4$ poise at about 270° C. Further, polystyrene has the melting viscosity of about $5 \times 10^4$ poise at about 180° C.

When the thermal molding process is performed at the temperature near the melting state, decomposition due to gas atmosphere (in particular, oxygen gas) often occurs during the molding process or thermal decomposition at a further higher temperature process.

Consequently, it is required that the thermal molding process is conducted under the condition that the resin does not causes the decomposition.

After they are thermally molded and cooled, the fiber for fiber laser is molded to the desired shape. Thereafter, an optical part is attached so as to introduce the excitation light beam.

Subsequently, transparent fluoride resin having lower index of refraction than that of at least the resin coating is applied as an excitation light reflection film. Thereby, the fiber apparatus can be realized to obtain the laser light beam having a high output.

According to this invention, the fiber surface is coated with the thermoplastic optical resin. Thereby, the fibers are connected and welded to be integrated to the predetermined shape. In consequence, the manufacturing method becomes easy and simple, and the output of the fiber laser can be enhanced.

EXAMPLES

In examples, the fiber was folded, curved and wound to form to an arbitrary shape. In this event, the fiber was formed by coating a long successive fiber added with the laser active substance into the core with thermoplastic resin transmitting the excitation light beam. The optical part was attached thereto so as to introduce the excitation light beam.

First Example

The quartz based glass fiber had a core diameter of 50 μm, a clad diameter of 125 μm, and the aperture number of 0.2. The laser fiber was formed by doping $Nd^{3+}$ ions of 0.2 at % into the core internal portion. The laser fiber was drawn by the fiber drawing apparatus.

In this event, the fiber was coated with an ultraviolet curing (hardening) resin of fluoro acrylate base by an in-line process. The ultraviolet curing resin had a glass transition temperature of 105° C., transparency within the wavelength range between 0.4 and 1.1 μm, and index of refraction of 1.46.

In this case, the thickness of the coating was equal to 20 μm. The index of refraction regarding the resin was equal to or substantially equal to the index of refraction of the clad to equalize with clad.

The laser fiber 23 was formed to the whirling shape (one layer) having an outer periphery of 100 mmφ, and was arranged on a metal plate 24, on which the transparent fluoride resin was mounted, such as, a gold plating metal plate.

Further, a thin plate of the transparent fluoride resin (not shown) was coated, and was contained in a vacuum heating apparatus (not shown).

The transparent fluoride resin serving as the second clad had the index of refraction of 1.33, and was lower than the index of refraction regarding the fiber clad 28 serving as the first clad and the ultraviolet curing resin of fluoro acrylate base equivalent to the first clad.

The fibers were weld to each other, and the bubbles were simultaneously removed on the condition that a pressure was reduced and a temperature was increased up to 150° C.

Thereafter, the temperature was returned to the room temperature, and the whirling outer periphery (outer periphery edge surface) was ground and polished.

Further the fiber 20 for taking out the output was welded to one edge portion of the fiber. While, the mirror 22, which reflected the light beam having wavelength of 1.06 μm with 99.9%, was attached to the other edge portion. Herein, it is to be noted that the mirror 22 could be formed by a multi-layer coating.

Moreover, the surface, which reflected the excitation light beam of the resin surface of the whirling outer periphery, was polished, and an excitation light reflection layer 26 formed by the transparent fluoride resin was removed.

A lens duct 21 was attached to the surface of the exposed transparent thermoplastic resin 25, and a head for the excitation light LD was attached to the respective lens ducts 21.

Figure 1B:
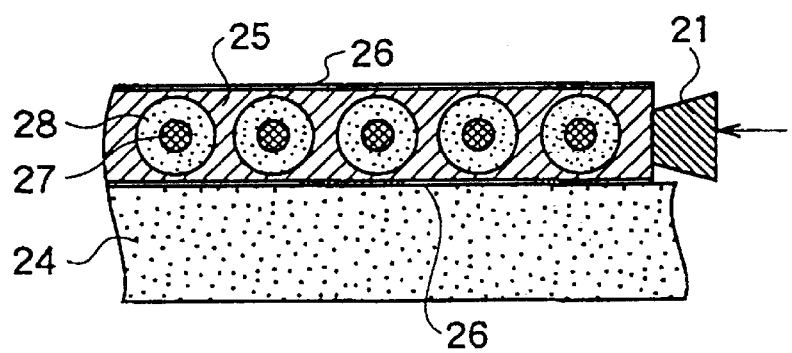
FIG. 1B is a cross sectional view, taken along A—A line in FIG. 1A.

In the illustrated example, the lens duct 21 having the excitation light LD was attached, as illustrated in FIG. 1B. In FIG. 1B, the reference number 27 represents a dope core while the reference number 28 indicates a fiber clad.

Figure 1C:
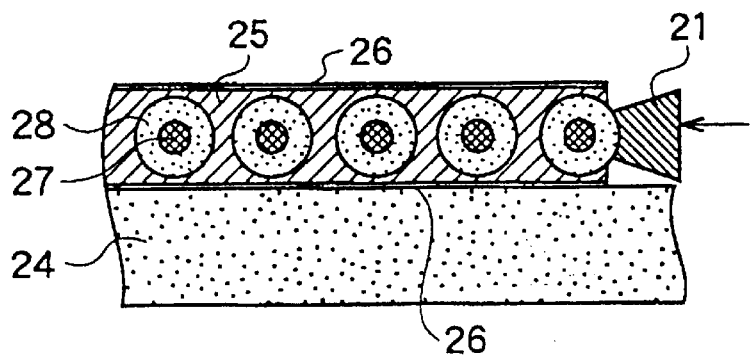
FIG. 1C is a cross sectional view having a polished surface, taken along A—A line in FIG. 1A.

Further, the grinding and polishing of the whirling outer periphery may be performed such that the surface of the fiber clad 28 positioned at the outermost periphery is exposed, and the lens duct 21 having the excitation LD may be directly attached to the exposed fiber clad 28, as illustrated in FIG. 1C.

When the excitation light beam was introduced into the thermoplastic reign 25 or the fiber clad 28 from the whirling outer periphery, the introduced excitation light beam was reflected by the excitation light reflection layers (namely, the transparent fluoride resin) 26 arranged upward and downward for the whirling portion.

The reflected light beam moved in a zigzag manner through the thermoplastic resin 25 and the fiber clad 28, and was wound to the whirling shape, and was adsorbed in the dope core 27. Thereby, laser oscillation was carried out.

In this event, the number of the LD heads was equal to 23. When the excitation light beam of 20 W was simultaneously incident from each LD, it has been confirmed that the laser having the output of 180 W and the wavelength of 1.06 μm was oscillated from the edge surface of the fiber 20.

If an input port was arranged instead of the mirror 22 at the other edge portion of the fiber, an optical amplifier might be constituted such that a signal light beam amplified from the fiber 20 for taking out the output was produced.

Second Example

The quartz based glass fiber had a core diameter of 50 μm, a clad diameter of 125 μm, and the aperture number of 0.2.

The laser fiber was formed by doping $Nd^{3+}$ ions of 0.2 at % into the core internal portion. The laser fiber was drawn by the fiber drawing apparatus.

In this event, the fiber was coated with an ultraviolet curing (hardening) resin of fluoro acrylate base by the in-line process. The ultraviolet curing resin had a glass transition temperature of 70° C., transparency within the wavelength range between 0.4 and 1.1 μm, and index of refraction of 1.49. In this case, the thickness of the coating was equal to 20 μm.

Figure 2:
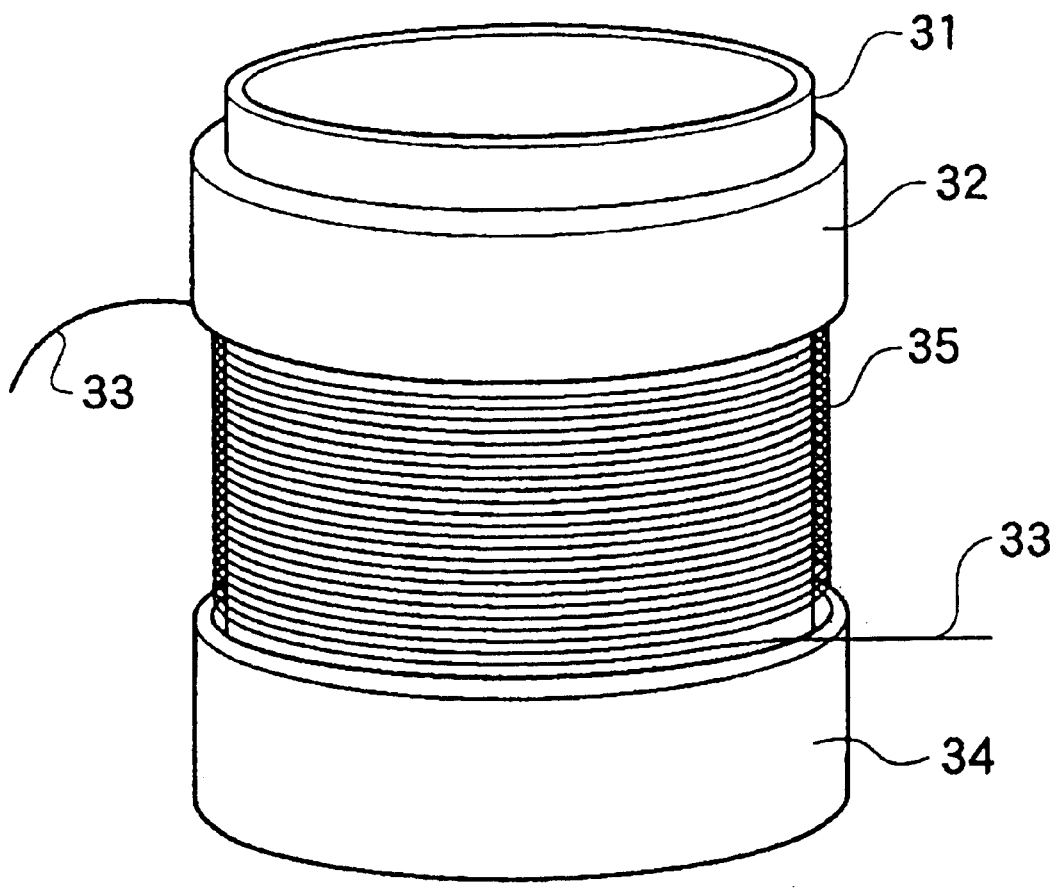
FIG. 2 is a diagram for explaining a fiber laser device having a cylindrical structure according to an embodiment of this invention.

As illustrated in FIG. 2, a fiber 33 was wound to a circular tube for winding the fiber and having an outer circumference of 100 mmφ. In this event, a circular tube 31 was formed by applying the transparent fluoride resin on a gold coat.

A ring 34 as a base substrate was arranged under the circular tube 31. In this event, the ring 34 had the substantially same inner diameter as the outer diameter of the circular tube 31.

With such a structure, the wound fiber 35 was positioned on the ring 34. Further, a ring 32 for a heavy stone was arranged so as to freely slide upward and downward for the circular tube 31 from the upper side of the winding portion, and was housed in the heating apparatus (not shown).

The internal of the heating apparatus was filled with nitrogen gas. The temperature thereof was raised up to 120° C. to weld the fibers to each other. Thereby, the bubbles were removed by the pressure of the ring 32.

Thereafter, the temperature was returned to the room temperature, and the ring 32 was removed. Further, 22 of prisms (not shown) were bonded for an upper outer circumference (periphery) of the fiber winding portion, and the heads for the excitation light LD were attached.

Moreover, the transparent fluoride resin having the index of the refraction of 1.33 was coated at the side surface of the fiber-winding portion.

A mirror 22 was attached to one edge portion of the fiber for taking out the output. This mirror 22 reflects the light beam having the wavelength of 1.06 μm with 99.9%.

Under this circumstance, when the excitation light beam of 20 W was incident from each LD, it has been confirmed that the laser beam having the wavelength of 1.06 μm and the output of 180 W was oscillated from the other edge surface of the fiber. In this case, if the input port is arranged instead of the mirror 22, the optical amplifier is constituted.

Third Example

In this example, when the laser of the first example was fabricated, a cross sectional shape of the resin monomer filling cup 15 of the resin coating portion was formed to a rectangular shape in the step for drawing the fiber.

Figure 4A:
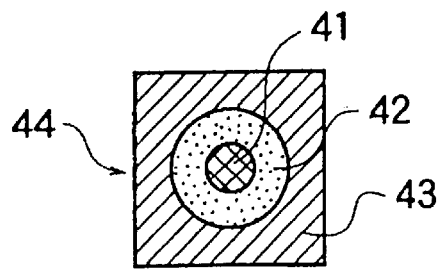
FIGS. 4A and 4B are views for explaining a method of manufacturing an optical medium according to an embodiment of this invention.

Thereby, the thermoplastic resin 43 was coated for the fiber to the rectangular shape, as illustrated in FIG. 4A. In this event, the fiber was made by integrally forming the fiber clad 42 with the dope core 41.

Figure 4B:
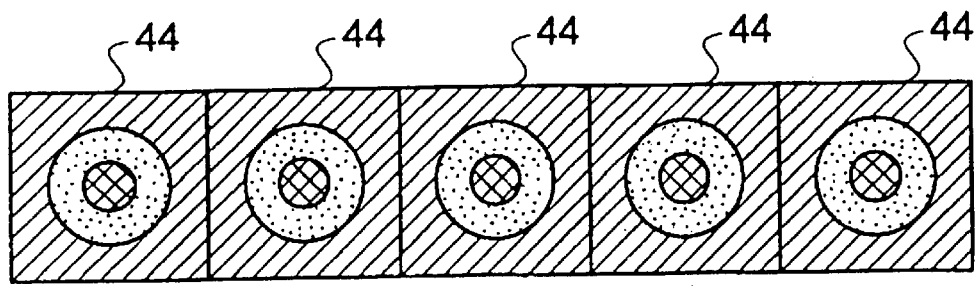

Thus, the fibers 44 were closely bonded to each other so as to constitute the circular shape, as illustrated in FIG. 4B. Herein, the laser fiber 44 was coated with the transparent thermoplastic resin 43, and had the cross sectional rectangular shape.

When the fibers were heated up to 150° C. and thermally welded with such a shape, the bubbles almost did not remain or left between the fibers 44 in comparison with the case that the coated fibers having the cross sectional circular shape were arranged and thermally molded.

Further, it is unnecessary to heat using the heavy stone and in vacuum. Thereby, the fibers were thermally welded in the nitrogen atmosphere. In consequence, the laser apparatus could be obtained in the same manner as the first example such that the output of 180 W could be realized.

Fourth Example

In this example, a laser fiber 54, which was not coated, was manufactured during the fiber drawing step in the first example.

Figure 5A:
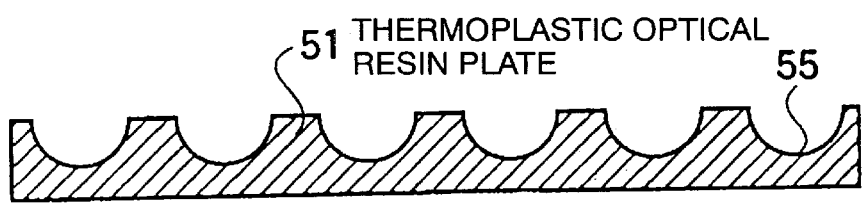
FIGS. 5A and 5B are views for explaining a method of manufacturing an optical medium according to another embodiment of this invention.
Figure 5B:
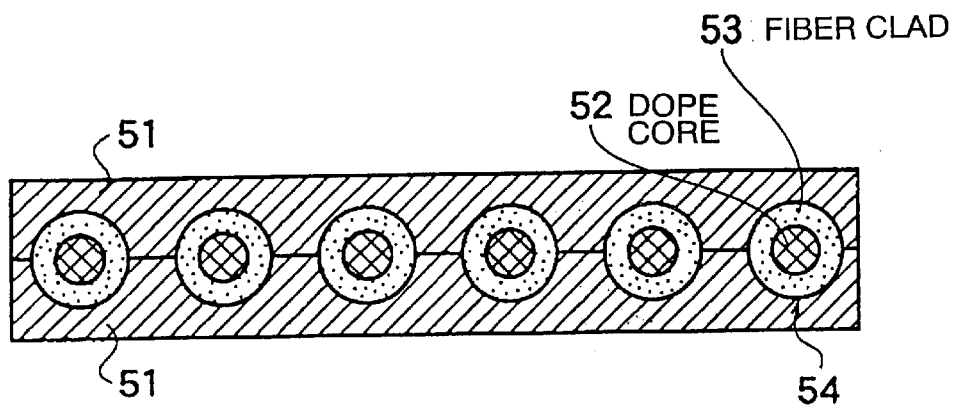

Other than the fiber 54, grooves 55 were formed such that the fiber 54 was wounded and aligned or arranged, as illustrated in FIGS. 5A and 5B. For example, half-circular grooves were previously formed to a spiral shape in the thermoplastic optical resin plate 51.

The laser fibers 54, which were not coated, were arranged on the resin plate 51. Further, the thermoplastic optical resin plate 51, in which the grooves 51 were formed in advance, was contacted therewith, and the plates 51 was heated up to 150° C. and was thermally welded with such a shape. Thereby, the desired laser fiber apparatus could be obtained.

Thus, the optical conductor can be molded to the desired shape by using the thermoplastic resin which transmits the excitation light beam according to this invention. As a result, the optical medium, the laser apparatus, and the optical amplifier can readily manufactured.

While this invention has thus far been disclosed in conjunction with several embodiments thereof, it will be readily possible for those skilled in the art to put this invention into practice in various other manners.

What is claimed is:

1. A method of manufacturing an optical medium, the optical medium being formed of a folded or wound optical conductor, which contains an active substance and comprises a core and cladding surrounding the core, that is fixed in a desired shape by the use of a thermoplastic resin, the optical medium being adapted to output a laser light beam or an amplified light beam from an edge portion of the optical conductor by absorbing an excitation light beam incident from a side surface of the optical conductor into the active substance through the resin, comprising the steps of:

fiber-drawing the optical conductor as an extended optical conductor;

applying the thermoplastic resin to the extended optical conductor, the thermoplastic resin being adapted to transmit the excitation light beam;

optically polymerizing or thermally polymerizing the liquid resin, resulting in a polymer-coated optical conductor;

arranging the polymer coated optical conductor into a predetermined shaped structure by repeatedly folding or winding the conductor in a manner so that the resin is present between adjacent parts of the folded or wound optical conductor;

heating the predetermined shaped structure so that the resin is heated up to a glass transition temperature or higher to make the optical conductor and the resin into an integral structure;

cooling the resin below the glass transition temperature; and obtaining the optical medium comprising the optical conductor arranged in the folded or wound shape and integrally fixed by the resin, the steps of fiber drawing, applying and polymerizing being carried out by an in-line process.

2. A method as claimed in claim 1, wherein:

the optical conductor comprises an optical fiber.

3. A method as claimed in claim 2, wherein:

the optical fiber has an outermost layer, the resin has a first index of refraction, and the outermost layer has a second index of refraction, the first index being substantially equal to the second index.

4. A method as claimed in claim 1, wherein:

the optical conductor comprises a core of an optical fiber, the resin has a first index of refraction, and the core has a second index of refraction, the first index being lower than the second index.

5. A method as claimed in claim 1, wherein:

the optical conductor and the resin are formed to a predetermined shape by a thermal welding process or a thermal molding process.

6. A method as claimed in claim 5, wherein:

the resin contains bubbles, and the thermal welding process is used to form the predetermined shape, wherein
the bubbles are removed by reducing a pressure during the thermal welding process.

7. A method as claimed in claim 5, wherein:

the resin contains bubbles, and the thermal molding process is used to form the predetermined shape, wherein
the bubbles are removed by increasing a pressure during the thermal molding process.

8. A method as claimed in claim 1, wherein:

the optical conductor and the resin are formed to a predetermined shape by heating the resin in inert gas atmosphere.

9. A method as claimed in claim 1, further comprising the step of:

polishing at least one portion of a surface of the resin after curing the resin.

10. A method as claimed in claim 9, wherein:

the one portion corresponds to a surface for reflecting the excitation light beam.

11. A method of manufacturing a laser device which outputs the laser beam from the edge of the optical conductor, comprising the steps of:

producing the optical medium by the use of the method claimed in claim 1; and arranging at least one excitation optical source such that the excitation light beam is incident from the side surface of the optical conductor and is absorbed into the active substance in order to excite the active substance.

12. A method of manufacturing an optical amplifier which outputs the amplified light beam from the edge of the optical conductor, comprising the steps of:

producing the optical medium by the use of the method claimed in claim 1;

forming an input port at one end of the optical conductor to receive a signal light beam to be amplified; and arranging at least one excitation optical source such that the excitation light beam is incident from the side surface of the optical conductor and is absorbed into the active substance in order to excite the active substance.

* * * * *